US012261388B2

(12) United States Patent
Wang et al.

(10) Patent No.: US 12,261,388 B2
(45) Date of Patent: Mar. 25, 2025

(54) ELECTRICAL CONNECTOR

(71) Applicant: Advanced Connectek Inc., New Taipei (TW)

(72) Inventors: Shu-Fen Wang, New Taipei (TW); Yu-Chai Yeh, New Taipei (TW); Yi Hsu, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 588 days.

(21) Appl. No.: 17/725,560

(22) Filed: Apr. 21, 2022

(65) Prior Publication Data

US 2022/0344856 A1 Oct. 27, 2022

(30) Foreign Application Priority Data

Apr. 23, 2021 (TW) ................................ 110204591
Apr. 23, 2021 (TW) ................................ 110204592

(51) Int. Cl.
*H01R 13/424* (2006.01)
*H01R 13/518* (2006.01)

(52) U.S. Cl.
CPC ......... *H01R 13/424* (2013.01); *H01R 13/518* (2013.01)

(58) Field of Classification Search
CPC ...... H01R 13/40; H01R 13/41; H01R 13/415; H01R 13/424; H01R 13/518; H01R 13/5658; H01R 13/6586
USPC .......................................................... 439/686
See application file for complete search history.

(56) References Cited

U.S. PATENT DOCUMENTS

| | | | | |
|---|---|---|---|---|
| 10,553,998 | B2 * | 2/2020 | Tsai | H01R 24/64 |
| 10,720,732 | B2 * | 7/2020 | Zhao | H01R 13/6594 |
| 10,797,426 | B2 * | 10/2020 | Zhao | H01R 13/405 |
| 11,245,216 | B2 * | 2/2022 | Zhao | H01R 13/405 |
| 2023/0094703 | A1 * | 3/2023 | Zhao | H01R 13/405 439/607.05 |

* cited by examiner

*Primary Examiner* — Khiem M Nguyen
(74) *Attorney, Agent, or Firm* — JCIPRNET

(57) ABSTRACT

An electrical connector is provided, including an insulating body, multiple terminals, and a metallic plate. The insulating body has a base portion and a tongue portion. The terminals are disposed at the insulating body and extending from the base portion to the tongue portion, respectively. Portions of the terminals exposed from the tongue portion are configured to be mated with terminals of another electrical connector. The metallic plate is disposed in the insulating body. The terminals are divided into two groups by the metallic plate. The metallic plate has at least one strip connecting portion, and the strip connecting portion exposes at the base portion of the insulating body.

23 Claims, 9 Drawing Sheets

ELECTRICAL CONNECTOR

CROSS-REFERENCE TO RELATED APPLICATION

This application claims the priority benefit of Taiwan application serial no. 110204592, filed on Apr. 23, 2021, and Taiwan application serial no. 110204591, filed on Apr. 23, 2021. The entirety of each of the above-mentioned patent applications is hereby incorporated by reference herein and made a part of this specification.

BACKGROUND

Technical Field

The disclosure is related to an electrical connector.

Description of Related Art

Universal serial bus (USB), generally used as an interface of electrical connectors, is popular for its relatively small size and high portability, and is commonly disposed with connection holes and transmission lines of portable electronic devices such as smart mobile communication devices, digital cameras for mating.

Taking the existing USB Type-C electrical connector as an example, the position of disposing terminals and the combination between the terminals and an insulating body by injection molding are two factors that need to be considered. In other words, during miniaturization of the electrical connectors, the above combination process often makes the electrical connectors difficult to manufacture, or the terminals may be poorly combined, or even be deformed or shifted in the above combination process. In these situations, capacitive effect and noise interference problems are prone to occur. As a result, how to solve problems of conventional structures is what people skilled in relevant arts need to consider.

SUMMARY

The disclosure provides an electrical connector, where a strip connecting portion of a metallic plate is disposed in a base portion of an insulating body, and a notch and an adhesive opening of the metallic plate are disposed near a front edge of a tongue portion of the insulating body to provide a better structural configuration and thereby facilitate a combination process of terminals and the insulating body.

The electrical connector of the disclosure includes the insulating body, multiple terminals, and the metallic plate. The insulating body has a base portion and a tongue portion. The terminals are respectively disposed at the insulating body and extend from the base portion to the tongue portion. Portions of the terminals exposed from the tongue portion are configured to be mated with another multiple terminals of another electrical connector. The metallic plate is disposed in the insulating body. The terminals are divided into two groups by the metallic plate. The metallic plate has at least one strip connecting portion, and the strip connecting portion exposes at the base portion of the insulating body.

In an embodiment of the disclosure, a metal plate is stamped to form a stamping strip and the metallic plate connected to each other, and the stamping strip and the metallic plate are broken off from the strip connecting portion after the insulating body and the terminals are assembled with the metallic plate.

In an embodiment of the disclosure, a thickness of the strip connecting portion is less than a thickness of the metallic plate, and is also less than a thickness of the stamping strip.

In an embodiment of the disclosure, the strip connecting portion exposes at two opposite sides of the base portion of the insulating body.

In an embodiment of the disclosure, the strip connecting portion exposes at a rear side of the base portion of the insulating body.

In an embodiment of the disclosure, the metallic plate has a main portion and two branches extending from the main portion. The main portion is located at the tongue portion, the two branches are located at the base portion, and the strip connecting portion is located at the branch.

In an embodiment of the disclosure, the insulating body has two members separated by the metallic plate, one of which has at least one protruding pillar and the other has at least one positioning hole. The protruding pillar passes through at least one opening of the metallic plate and is assembled to the positioning hole.

In an embodiment of the disclosure, the metallic plate has the main portion and the two branches extending from the main portion. The main portion is located at the tongue portion, the two branches are located at the base portion, and the strip connecting portion is located at the branch.

In an embodiment of the disclosure, the insulating body has a supporting block located at the tongue portion. A power terminal or a ground terminal among the multiple terminals is supported on the metallic plate by the supporting block to keep a distance from the metallic plate. A length of the power terminal or the ground terminal at the tongue portion is greater than a length of the other terminals at the tongue portion.

Based on the above, with the strip connecting portion of the metallic plate disposed on the base portion of the insulating body, the electrical connector is exposed from the base portion, which facilitates the combination process of the insulating body, the terminals, and the metallic plate. In other words, the insulating body, the terminals, and the metallic plate are combined together, and then the metallic plate and the stamping strip are broken off from the strip connecting portion. In addition, the electrical connector is also disposed at the front edge of the insulating body through the notch and the adhesive openings of the metallic plate, and the notch and the adhesive openings are aligned along the same straight line, which facilitates the combination process in which a liquid adhesive passes through the notch and the adhesive openings and is finally cured to form the insulating body. Accordingly, the aforementioned combination process may be simplified to achieve better structural strength and terminal positioning accuracy.

DESCRIPTION OF THE EMBODIMENTS

Figure 1:
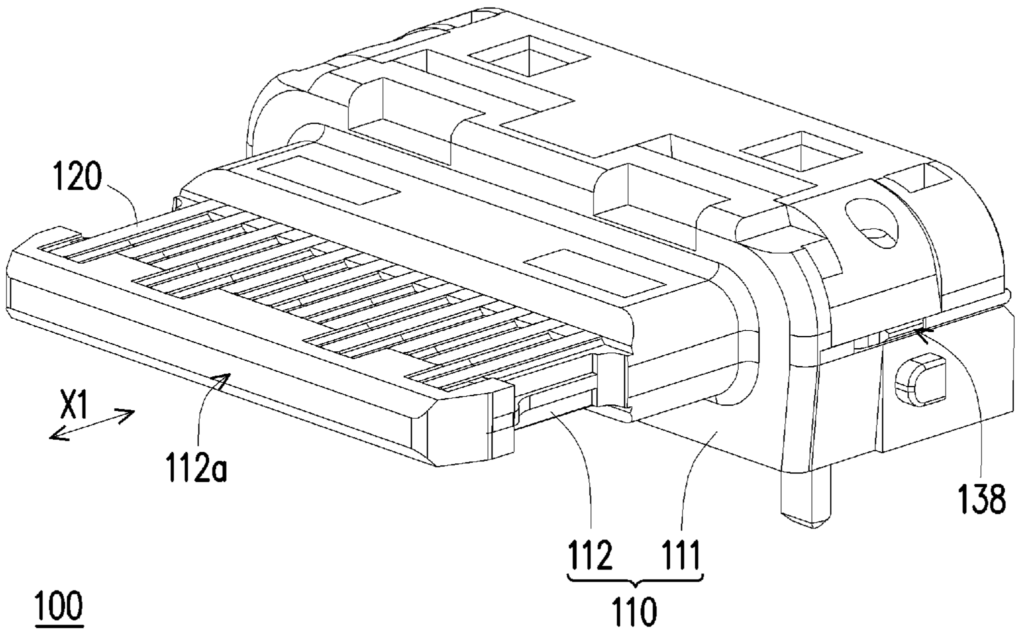
FIG. 1 is a schematic view of an electrical connector according to an embodiment of the disclosure.
Figure 2:
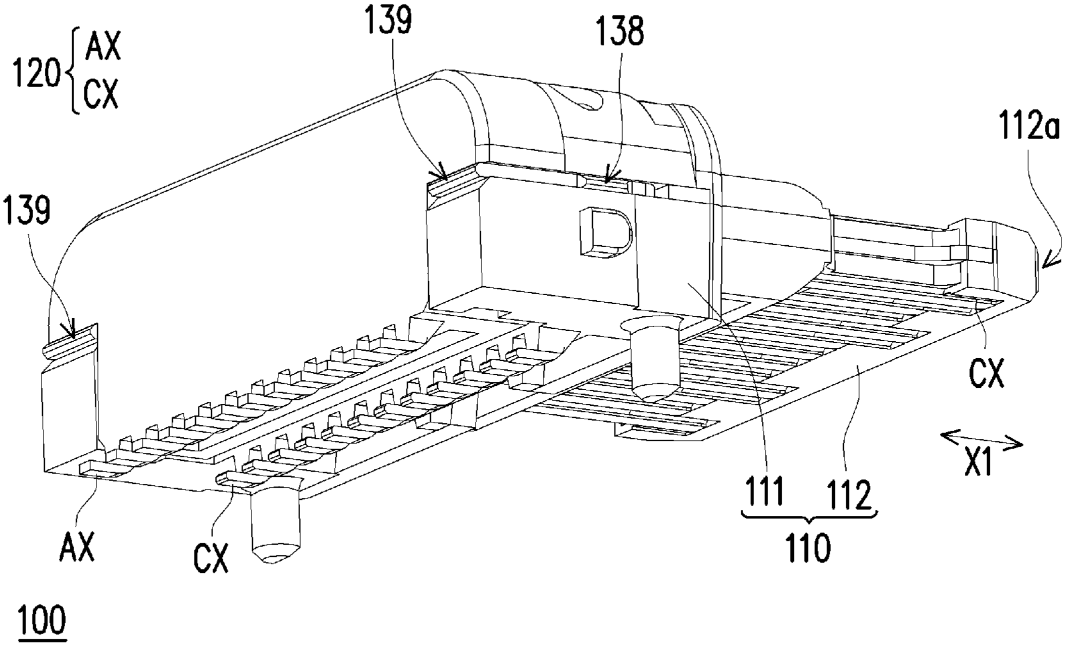
FIG. 2 illustrates the electrical connector of FIG. 1 from another perspective.

FIG. 1 is a schematic view of an electrical connector according to an embodiment of the disclosure. FIG. 2 illustrates the electrical connector of FIG. 1 from another perspective. With reference to FIG. 1 and FIG. 2 together, in this embodiment, an electrical connector 100, exemplified as a receptacle electrical connector herein, includes an insulating body 110 and multiple terminals 120. The insulating body 110 has a base portion 111 and a tongue portion 112. The terminals 120 are respectively disposed on the insulating body 110 and extend from the base portion 111 to the tongue portion 112. The insulating body 110 further includes a thickened step portion. The thickened step portion is located at a root of the tongue portion 112. Portions of the terminals 120 exposed from the tongue portion 112 are configured to be mated with multiple terminals of another electrical connector along a mating axial direction X1.

Figure 3:
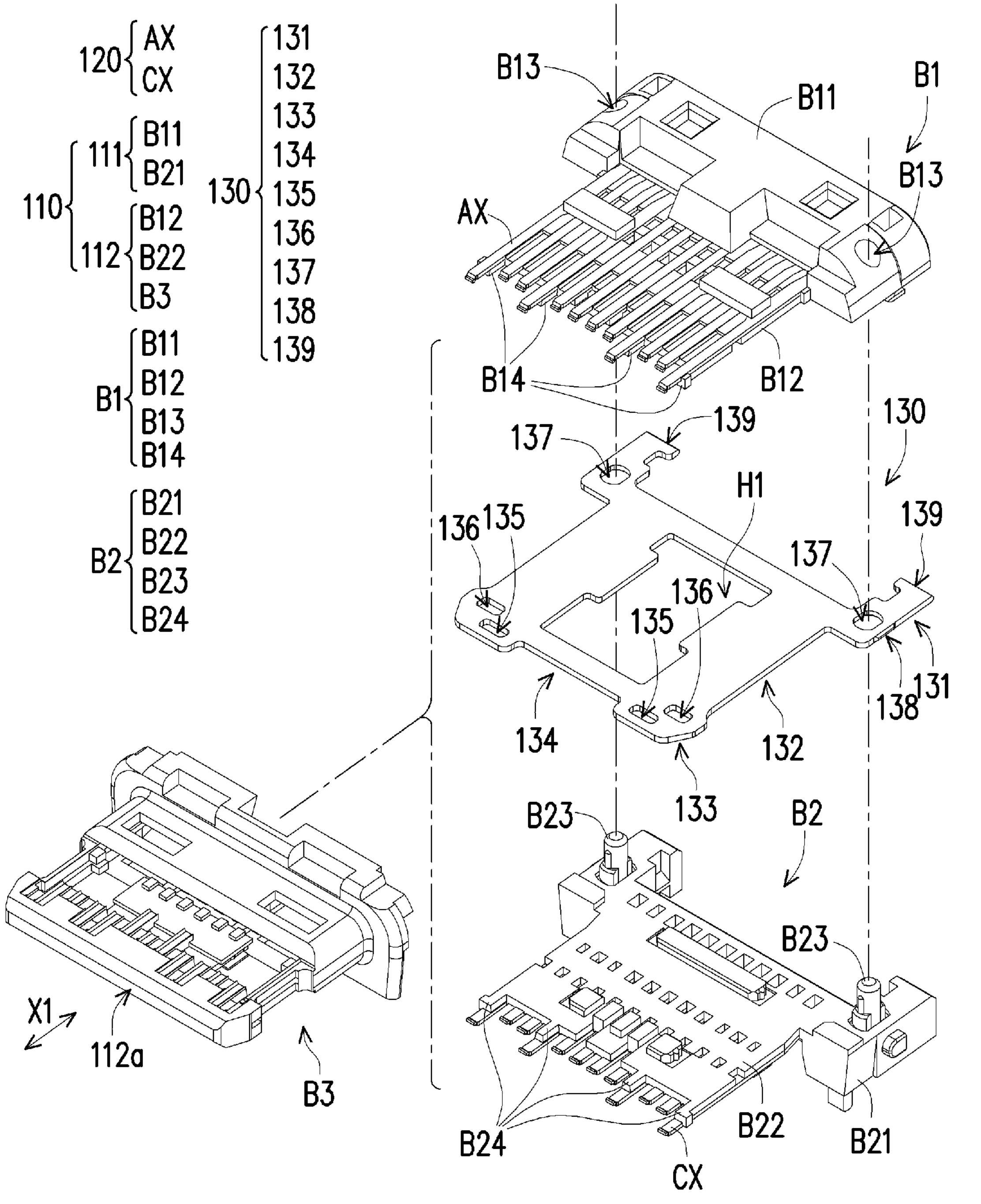
FIG. 3 is a schematic exploded view of the electrical connector of FIG. 1.

FIG. 3 is a schematic exploded view of the electrical connector of FIG. 1. With reference to FIG. 1 to FIG. 3 together, in this embodiment, the electrical connector 100 further includes a metallic plate 130, disposed in the insulating body 110. The terminals 120 are divided by the metallic plate 130 into an upper terminal group AX and a lower terminal group CX. The metallic plate 130 is a shielding plate. Furthermore, the metallic plate 130 has strip connecting portions 138 and 139. As shown in FIG. 1 and FIG. 2, the strip connecting portions 138 and 139 expose at the base portion 111 of the insulating body 110.

Figure 4:
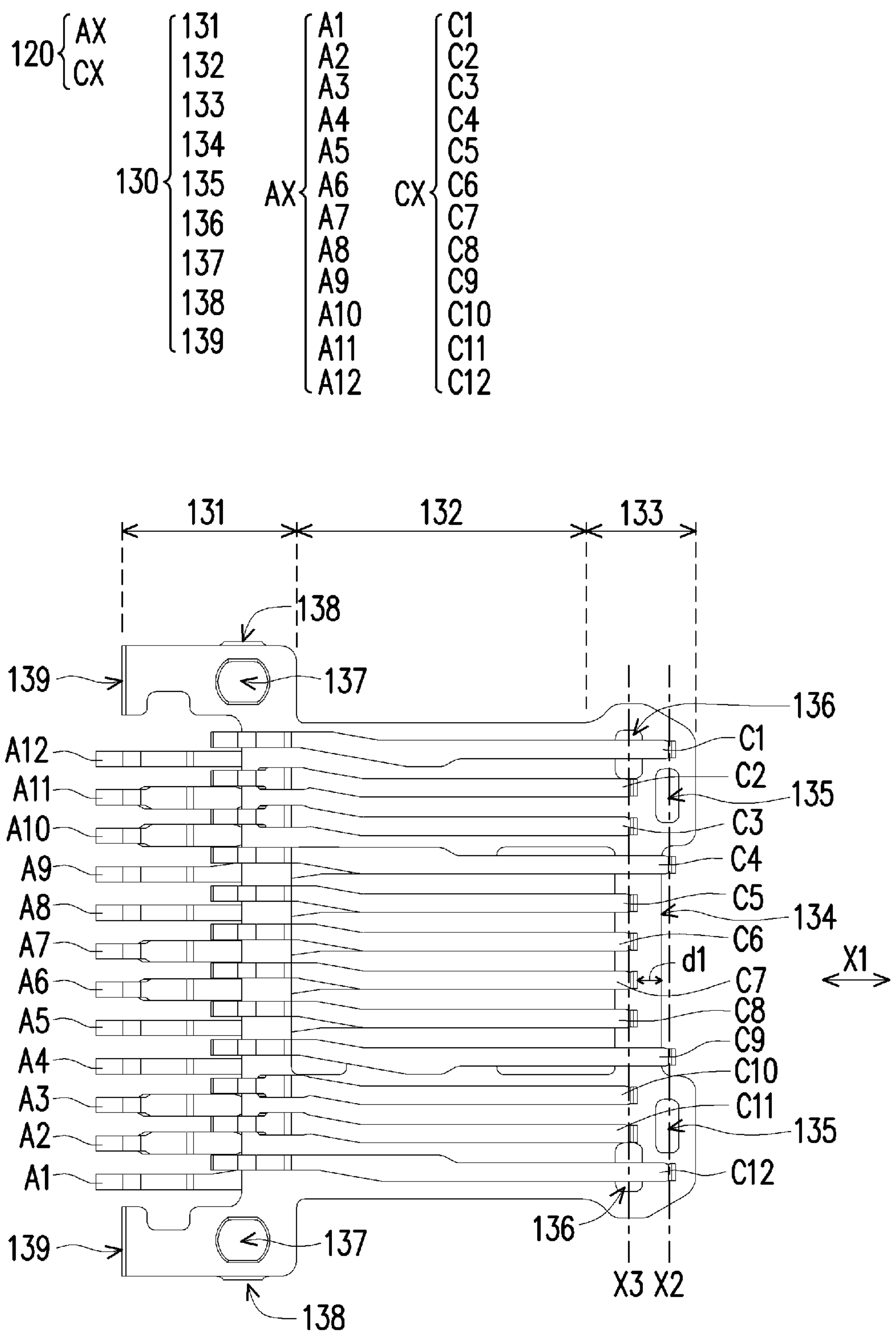
FIG. 4 illustrates terminals and a metallic plate of the electrical connector of FIG. 1 from a top view perspective.
Figure 5:
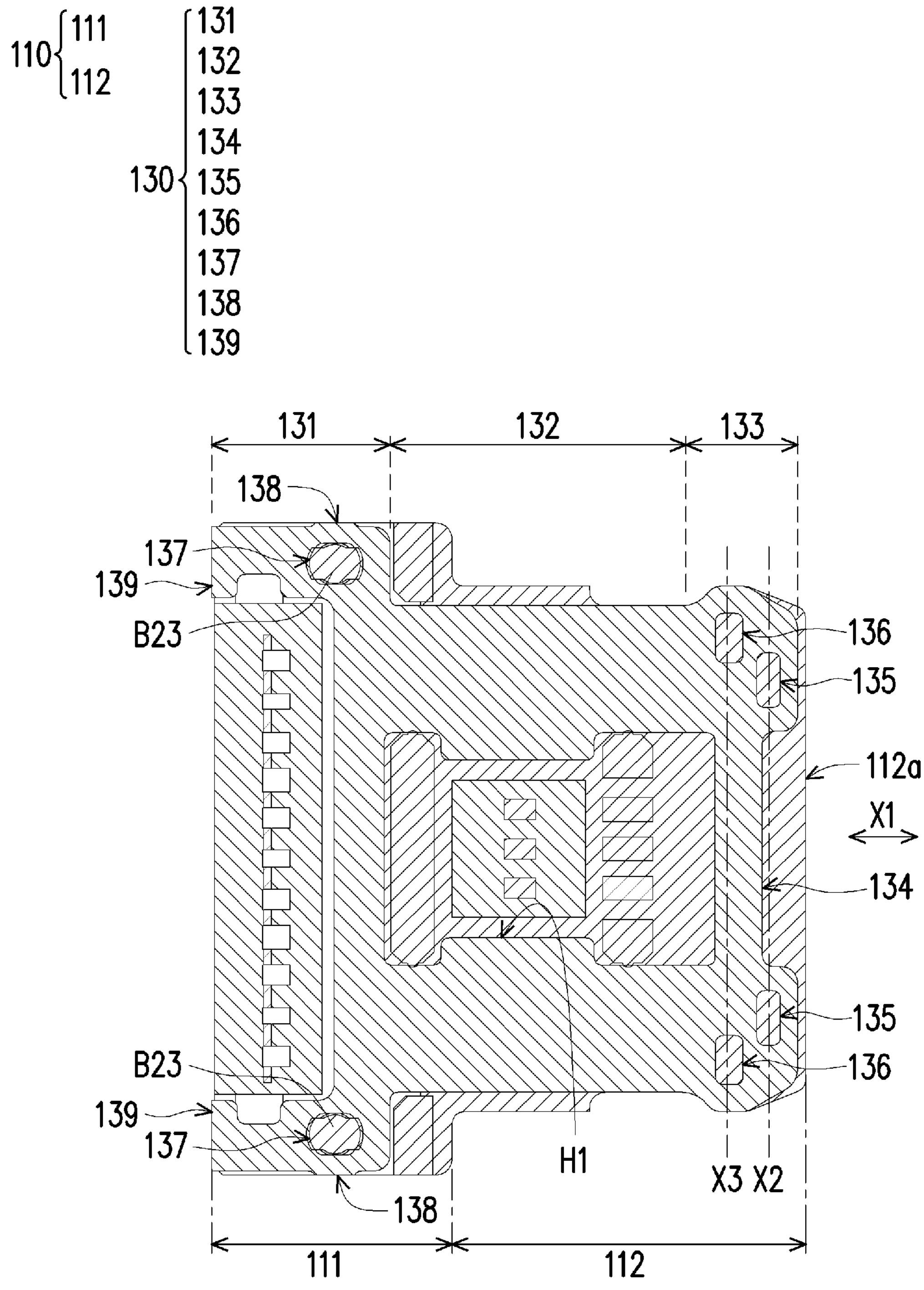
FIG. 5 is a cross-sectional view of the electrical connector of FIG. 1 from a top view perspective.

FIG. 4 illustrates the terminals and the metallic plate of the electrical connector of FIG. 1 from a top view perspective. FIG. 5 is a cross-sectional view of the electrical connector of FIG. 1 from a top view perspective. With reference to FIG. 3 to FIG. 5 together, in this embodiment, the metallic plate 130 has a notch 134 and first adhesive openings 135, which are respectively located at the tongue portion 112 of the insulating body 110 and substantially located near a front edge 112*a* of the insulating body 110. The notch 134 is aligned with the first adhesive openings 135 along a straight line X2.

Figure 6:
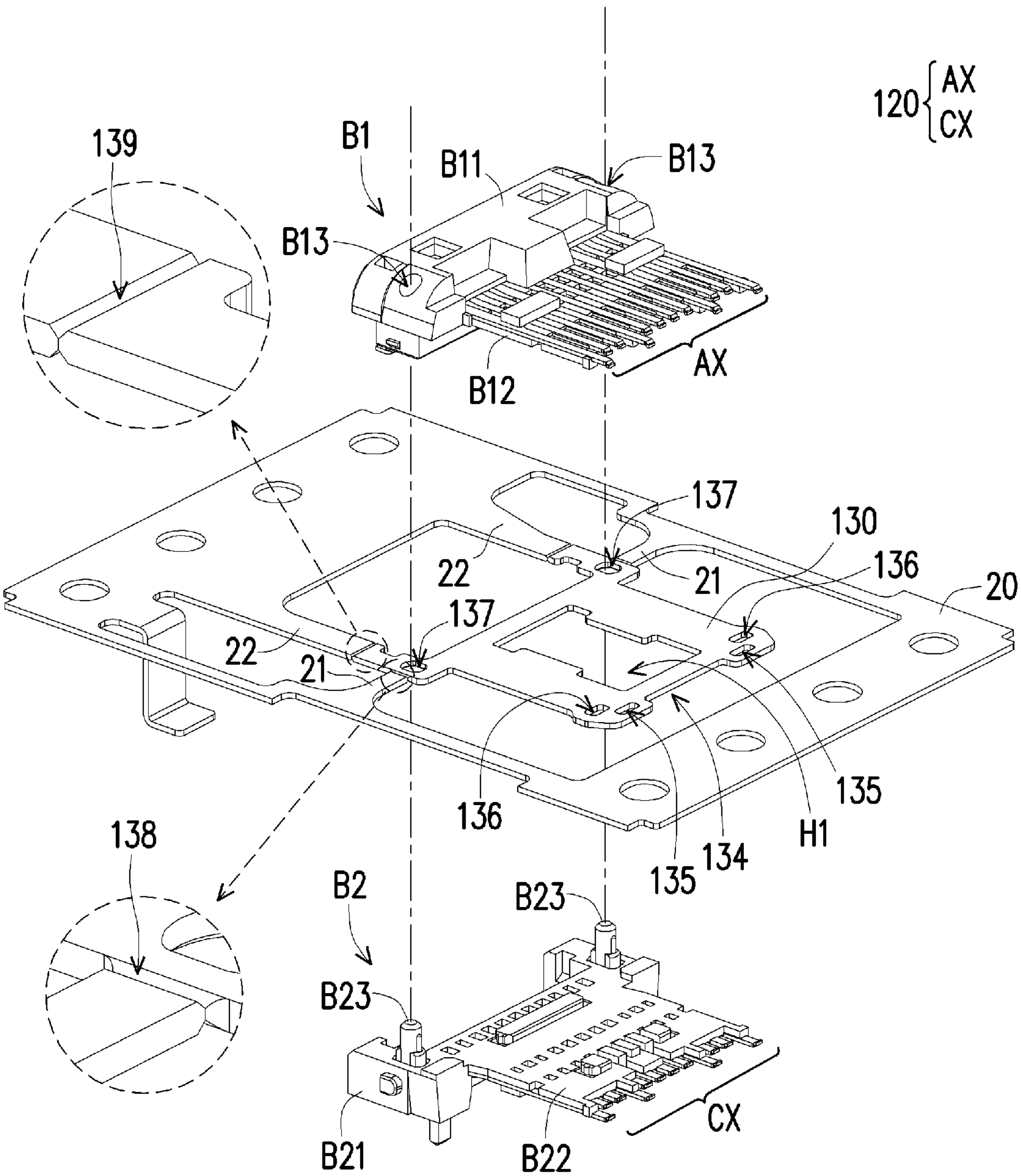
FIG. 6 to FIG. 8 illustrate a manufacturing process of the electrical connector of FIG. 1.
Figure 7:
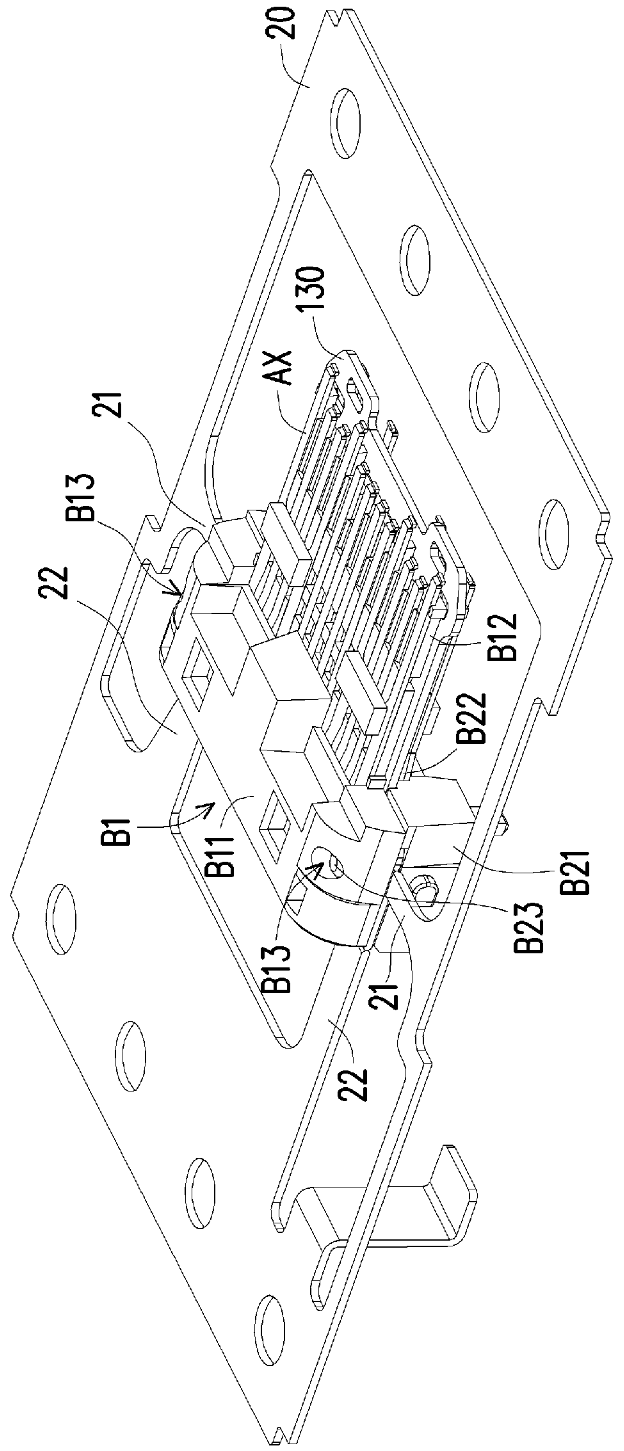
Figure 8:
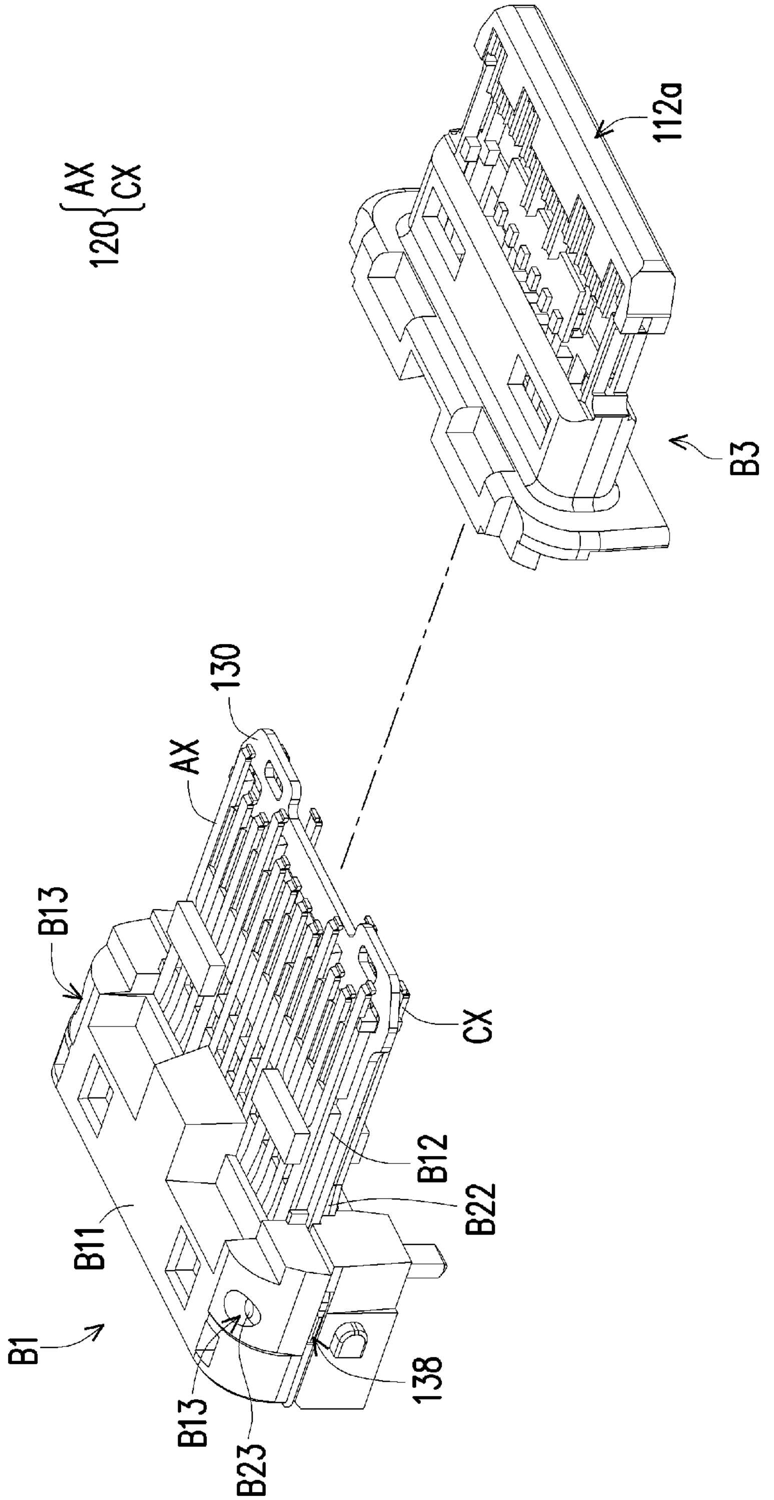

FIG. 6 to FIG. 8 illustrate a manufacturing process of the electrical connector of FIG. 1. With reference to FIG. 3 and FIG. 6 first, in this embodiment, as shown in FIG. 3, the insulating body 110 includes three different members B1 to B3 independent of each other, and the terminals 120 are also divided into different terminal groups AX and CX. Terminals in the terminal group AX are respectively formed by stamping and bending a same conductive metal plate, and terminals in the terminal group CX are also formed in a same way. Accordingly, during the manufacturing process of the electrical connector 100, the member B1 is combined with the terminal group AX, and the member B2 is combined with the terminal group CX by injection molding.

Next, as shown in FIG. 6, a stamping strip 20, such as a metal plate, is provided and stamped to form the metallic plate 130 and branch portions 21 and 22 of the stamping strip 20, which are still connected to each other at this time. That is, the metallic plate 130 is connected to the branch portions 21 and 22 of the stamping strip 20 through the strip connecting portions 138 and 139.

Next, the member B1 and the terminal group AX that have been combined together and the member B2 and the terminal group CX that have been combined together are respectively assembled to the metallic plate 130. As shown in FIG. 6, the member B1 is divided into a first portion B11 and a second portion B12, and has positioning holes B13 on the first portion B11, whereas the member B2 is divided into a first portion B21 and a second portion B22, and has protruding pillars B23 on the first portion B21. Here, the protruding pillars B23 are assembled into the positioning holes B13 through openings 137 of the metallic plate 130, and are formed to clamp the metallic plate 130 between one component (the member B1 and the terminal group AX) and another component (the member B2 and the terminal group CX) as shown in FIG. 7. Next, the metallic plate 130 and the components that have been assembled may be removed from the strip connecting portions 138 and 139, so that the stamping strip 20 and the metallic plate 130 may be broken off from the strip connecting portions 138 and 139. Here, as shown in FIG. 6, a thickness of the strip connecting portions 138 and 139 is less than a thickness of the metallic plate 130, and is also less than a thickness of the stamping strip 20, so that a necking structure easy to break off is formed.

Finally, as shown in FIG. 8, by injection molding for the second time (injection molding is performed for the first time to respectively combine the member B1 with the terminal group AX and the member B2 with the terminal group CX as mentioned above), a member B3 of the insulating body 110 is formed on the aforementioned assembled structure for combining the member B1 (along with the terminal group AX thereon), the metallic plate 130, and the member B2 (along with the terminal group CX thereon) together. By this time, the first portion B11 of the member B1 and the first portion B21 of the member B2 form the base portion 111 of the insulating body 110, whereas the second portion B12 of the member B1, the second portion B22 of the member B2, and the member B3 form the tongue portion 112 of the insulating body 110. In order to facilitate recognition of structural features, the member B3 is illustrated separately.

With reference to FIG. 5 again, it provides a schematic view of an internal structure of the electrical connector 100 by cross-sectioning. With reference to FIG. 3, FIG. 5, and FIG. 6 together, it is obvious that the metallic plate 130 is divided into a main portion 132, a pair of leading corner portions 133, and a pair of branches 131. The leading corner portions 133 and the branches 131 are located on two opposite sides of the main portion 132 and extend away from each other. The openings 137 configured for the protruding pillars B23 to pass through and the strip connecting portions 138 and 139 are located at the branches 131, respectively. At the same time, FIG. 5 also clearly shows a correspondence between the branch 131, the main portion 132, and the leading corner portion 133 of the metallic plate 130 relative to the base portion 111 and the tongue portion 112 of the insulating body 110. Here, if the metallic plate 130 corresponds to the insulating body 110, the main portion 132 of the metallic plate 130 is substantially located at the tongue portion 112 of the insulating body 110, the branch 131 is located at the base portion 111 of the insulating body 110, a central opening H1 of the metallic plate 130 extends from the tongue portion 112 to the base portion 111, and the stamping strip 20 is connected to the branch 131 of the metallic plate 130 through the branch portions 21 and 22.

As shown in FIG. 1 and FIG. 2 as well, in the electrical connector 100 which has been assembled and combined, the strip connecting portion 138 of the metallic plate 130 exposes at two opposite sides (left and right sides) of the base portion 111 of the insulating body 110, whereas the strip connecting portion 139 exposes at a rear side of the base portion 111 of the insulating body 110. In other words, the metallic plate 130 limits the strip connecting portions 138 and 139 to the branches 131, so that the main portion 132 and the leading corner portion 133 may obtain additional design allowance and flexibility to facilitate a final forming process of the member B3 as detailed in the following paragraphs.

The design allowance and flexibility mentioned above are shown by the fact that the metallic plate 130 of this embodiment further has the first adhesive openings 135, the second adhesive openings 136, and the notch 134. The notch 134 is located between the leading corner portions 133, and the first adhesive openings 135 and the second adhesive openings 136 are located at the leading corner portions 133. A distance between the second adhesive opening 136 and the notch 134 is greater than a distance between the first adhesive opening 135 and the notch 134. As shown in FIG. 5, in the above process of forming the member B3, a partial structure of the member B3 encapsulates most of the metallic plate 130 through the first adhesive openings 135, the second adhesive openings 136, and the notch 134. That is, different partial structures of the insulating body 110 respectively pass through the first adhesive openings 135, the second adhesive openings 136, and the notch 134, so that the member B3 of the insulating body 110 and the metallic plate 130 may be firmly combined. Here, on the straight line X2, the first adhesive openings 135 are located on two opposite sides of the notch 134 (equivalent to the straight line X2 passing through the two opposite sides), and the second adhesive openings 136 are arranged along a straight line X3. The straight line X2 is parallel to the straight line X3. After the member B3 is formed, a distance between the second adhesive opening 136 and the front edge 112*a* is greater than a distance between the first adhesive opening 135 and the front edge 112*a*.

With reference to FIG. 4 and FIG. 5 together, FIG. 4 is equivalent to a bottom view of FIG. 3 illustrated after assembling and forming are completed. Here, by describing a correspondence between the terminals 120 and the metallic plate 130, a relative relationship between the insulating body 110, the terminals 120, and the metallic plate 130 may be shown more clearly. In this embodiment, the terminal groups AX and CX are arranged in opposite directions, which allows the electrical connector 100 to be inserted in both forward and reverse directions. The terminal group AX includes terminals A1 to A12, which are a ground terminal (GND), high-speed signal terminals (SuperSpeed differential signal, namely TX+ and TX−), a power terminal (Vbus), a configuration channel (CC) terminal, signal terminals (USB 2.0 differential signal, namely D+ and D−), a sideband use (SBU) signal terminal, a power terminal (Vbus), high-speed signal terminals (SuperSpeed differential signal #2, namely RX− and RX+), and a ground terminal (GND) in sequence. On the other hand, the terminal group CX includes terminals C1 to C12, and the terminals C1 to C12 are defined the same as the aforementioned terminals in the terminal group AX, but are arranged in a direction opposite to that of the terminal group AX.

In short, short terminals (such as the terminals A2, A3, A5 to A8, A10, and A11, and the terminals C2, C3, C5 to C8, C10, and C11) are signal terminals, whereas long terminals (such as the terminals A1, A4, A9, and A12, and the terminals C1, C4, C9, and C12) are ground terminals or power terminals. The terminals separated into upper and lower rows by the metallic plate have the same signal but are arranged in left and right opposite directions, which allows the electrical connector 100 to be mated and used in both forward and reverse directions.

Furthermore, as shown in FIG. 4, in the metallic plate 130, the first adhesive opening 135 does not overlap with any terminals (the terminals A1 to A12 and C1 to C12), the second adhesive opening 136 only overlaps with the ground terminals (the terminals C1, C12, A1, and A12) of the multiple terminals 120, and the power terminals (the terminals A4, A9, C4, and C9) partially protrude from the notch 134 of the metallic plate 130, which also means the second adhesive opening 136 does not overlap with the high-speed signal terminals (the terminals A2, A3, A10, A11, C2, C3, C10, and C11). In addition, ends of low-speed signal terminals including the CC terminals (the terminals A5 and C5), the signal terminals (the terminals A6, A7, C6, and C7), and the SBU signal terminals (A8 and C8) respectively keep a distance d1 from the notch 134. Among them, these low-speed signal terminals (the terminals A5 to A8 and C5 to C8) are substantially located between the power terminals (the terminals A4, A9, C4, and C9).

On the other hand, with reference to FIG. 3 again, in order to stabilize the long terminals (the terminals A1, A4, A9, and A12, and the terminals C1, C4, C9, and C12) in a forming process of the member B3 to avoid misalignment or deformation, the insulating body 110 of this embodiment further includes a supporting block B14 disposed on the member B1 and a supporting block B24 disposed on the member B2. The supporting block B14 protrudes from the first portion B12, whereas the supporting block B24 protrudes from the second portion B22, so that the long terminals may also form a relatively large abutting area with the members B1 and B2 to obtain sufficient support strength for respectively keeping a distance with the metallic plate 130 by the supporting blocks B14 and B24 during forming the member B3.

Figure 9:
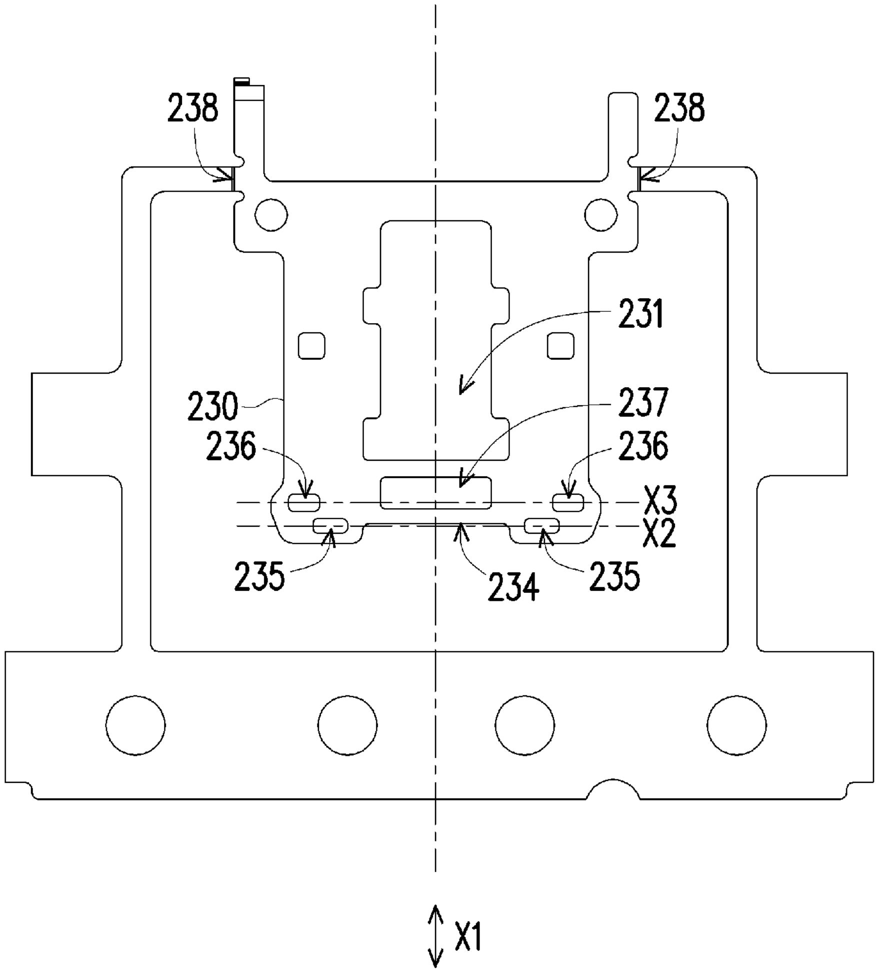
FIG. 9 is a schematic view of a metallic plate according to another embodiment of the disclosure.

FIG. 9 is a schematic view of a metallic plate according to another embodiment of the disclosure. With reference to FIG. 9, similar to the previous embodiment, the metallic plate of this embodiment has first adhesive openings 235, second adhesive openings 236, and a notch 234. Moreover, the first adhesive openings 235 and the notch 234 are located on the straight line X2. The difference from the previous embodiment is that a metallic plate 230 of this embodiment further has a third adhesive opening 237 located on the straight line X3 with the second adhesive openings 236 and also located on the mating axial direction X1 of the electrical connector with the notch 234 and an opening 231. The third adhesive opening 237 is located between the opening 231 and the notch 234. In addition, the metallic plate 230 of this embodiment is only connected to the stamping strip through strip connecting portions 238 on two opposite sides. That is, as shown in FIG. 9, after the metallic plate 230 is combined with the terminals 120 and the insulating body 110, the strip connecting portions 238 are exposed from the two opposite sides of the base portion of the insulating body, which is similar to the state shown in FIG. 1 and FIG. 2. Moreover, compared with the previous embodiment, in addition to the existing first adhesive openings 235 and the second adhesive openings 236, this embodiment provides an additional channel for the partial structure of the insulating body to pass through, which helps improve assembly strength between the metallic plate 230 and the insulating body and enhance fluidity and filling of the liquid insulating body in a mold during injection molding.

Figure 10:
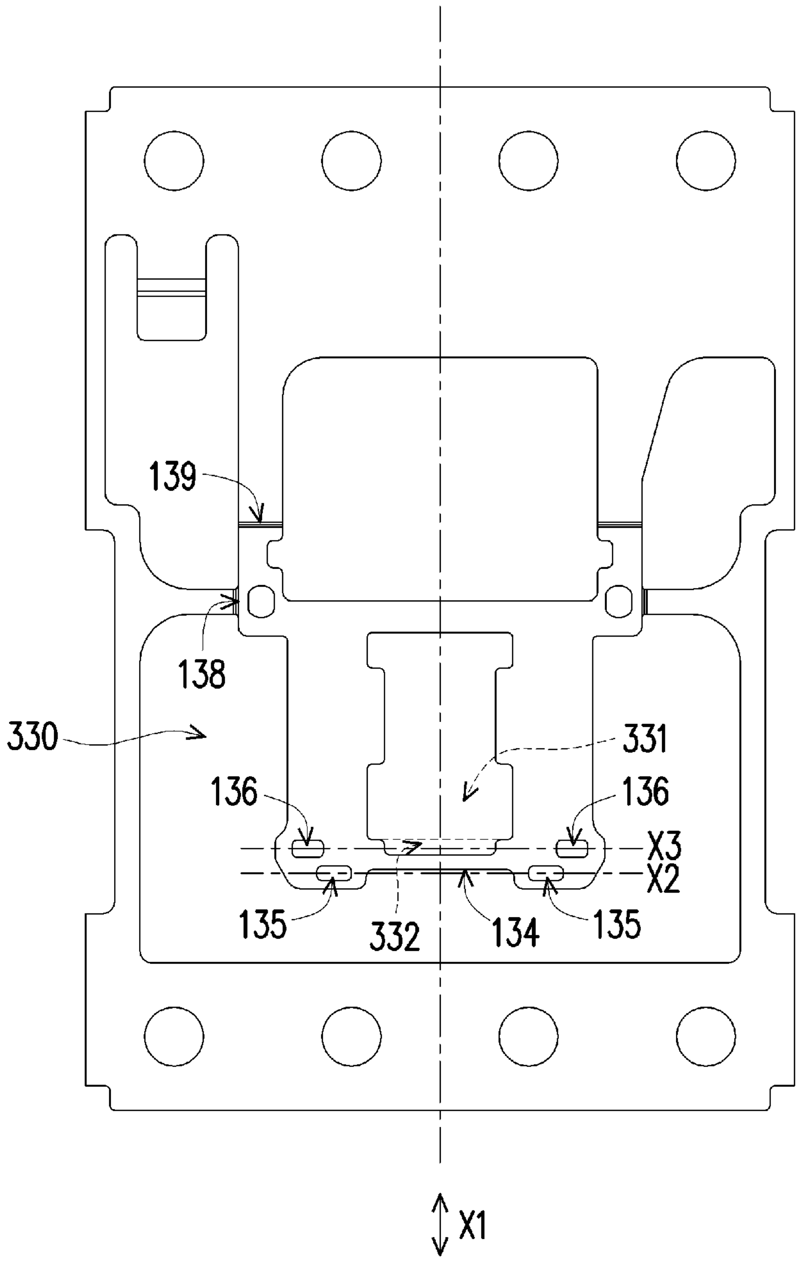
FIG. 10 is a schematic view of a metallic plate according to another embodiment of the disclosure.

FIG. 10 is a schematic view of a metallic plate according to another embodiment of the disclosure. With reference to FIG. 10, it should be noted that a metallic plate 330 of this embodiment is similar to the metallic plate 130 of the previous embodiment, so the same structural features shall be labeled with the same reference symbols, and descriptions will not be repeated. The difference from the previous embodiment is that there are openings 331 and 332 at a center of the metallic plate 330, and the openings 331 and 332 are integrated into one. That is, the openings 331 and 332 form a single enclosed opening in structure, and a third adhesive opening (the opening 332) of this embodiment may also be regarded as a portion of the single enclosed opening. Compared with the previous embodiment, the opening 331 is equivalent to the opening H1 of the previous embodiment. That is, this embodiment expands the size of the opening, so that the opening 332 provides an additional channel for the insulating body to pass through. Compared with the embodiment shown in FIG. 9, the opening 332 of this embodiment may produce the same effect as the third adhesive opening 237. Both of them may improve the fluidity and filling of the liquid insulating body during injection molding to enhance the assembly strength of the insulating body with the metallic plates 230 and 330.

To sum up, in the above embodiments of the disclosure, with the strip connecting portion of the metallic plate disposed on the base portion of the insulating body, the electrical connector is exposed from the base portion, which facilitates the combination process of the insulating body, the terminals, and the metallic plate. In other words, the insulating body, the terminals, and the metallic plate are combined together, and then the metallic plate and the stamping strip are broken off from the strip connecting portion. In addition, the electrical connector is also disposed at the front edge of the insulating body through the notch and the adhesive openings of the metallic plate, and the notch and the adhesive openings are aligned along the same straight line, which facilitates the combination process in which a liquid adhesive passes through the notch and the adhesive openings and is finally cured to form the insulating body. Accordingly, the aforementioned combination process may be simplified to achieve better structural strength and terminal positioning accuracy.

Furthermore, since the strip connecting portion of the metallic plate is limited at the base portion of the insulating body, the tongue portion and the metallic plate of the insulating body obtain additional design allowance and flexibility, which facilitates the injection molding process between the insulating body and the metallic plate. In other words, the multiple adhesive openings disclosed in the previous embodiments may improve the fluidity and filling of the liquid insulating body in the mold during injection molding and thereby enhance the assembly strength between the insulating body and the metallic plate.

What is claimed is:

1. An electrical connector, comprising:
- an insulating body, having a base portion and a tongue portion;
- a plurality of terminals, respectively disposed at the insulating body, and extending from the base portion to the tongue portion, wherein portions of the plurality of terminals exposed from the tongue portion are configured to be mated with another plurality of terminals of another electrical connector; and
- a metallic plate, disposed in the insulating body, dividing the plurality of terminals into two groups, and having at least one strip connecting portion exposing at the base portion of the insulating body.

2. The electrical connector according to claim 1, wherein a metal plate is stamped to form a stamping strip and the metallic plate connected to each other, and the stamping strip and the metallic plate are broken off from the strip connecting portion after the insulating body and the plurality of terminals are injection-molded with the metallic plate.

3. The electrical connector according to claim 2, wherein a thickness of the strip connecting portion is less than a thickness of the metallic plate, and is also less than a thickness of the stamping strip.

4. The electrical connector according to claim 1, wherein the strip connecting portion exposes at two opposite sides of the base portion of the insulating body.

5. The electrical connector according to claim 1, wherein the strip connecting portion exposes at a rear side of the base portion of the insulating body.

6. The electrical connector according to claim 1, wherein the metallic plate has a main portion and two branches extending from the main portion, the main portion is located at the tongue portion, the two branches are located at the base portion, and the strip connecting portion is located at the branch.

7. The electrical connector according to claim 1, wherein the insulating body has two members divided by the metallic plate, one of the members has at least one protruding pillar, the other member has at least one positioning hole, and the protruding pillar passes through at least one opening of the metallic plate and is assembled to the positioning hole.

8. The electrical connector according to claim 7, wherein the metallic plate has a main portion and two branches extending from the main portion, the main portion is located at the tongue portion, the two branches are located at the base portion, and the opening is located at the branch.

9. The electrical connector according to claim 1, wherein the insulating body has a supporting block located at the tongue portion, a power terminal or a ground terminal of the plurality of terminals is supported on the metallic plate by the supporting block to keep a distance from the metallic plate, and a length of the power terminal or the ground terminal at the tongue portion is greater than a length of remaining terminals at the tongue portion.

10. An electrical connector, comprising:
- an insulating body, having a base portion and a tongue portion having a front edge away from the base portion;
- a plurality of terminals, respectively disposed at the insulating body, and extending from the base portion to the tongue portion, wherein portions of the plurality of terminals exposed from the tongue portion are configured to be mated with another plurality of terminals of another electrical connector; and
- a metallic plate, disposed in the insulating body, and dividing the plurality of terminals into two groups, wherein the metallic plate has a notch and at least one first adhesive opening respectively located at the tongue portion, the notch is located near the front edge of the tongue portion, and the notch and the first adhesive opening are aligned along a same straight line.

11. The electrical connector according to claim 10, wherein the insulating body and the metallic plate are combined together by injection molding, the metallic plate has a pair of first adhesive openings configured for a partial structure of the insulating body to pass through, the pair of first adhesive openings are located on two opposite sides of the notch, and the straight line passes through the two opposite sides.

12. The electrical connector according to claim 10, wherein the first adhesive opening does not overlap with the plurality of terminals.

13. The electrical connector according to claim 10, wherein the metallic plate further has a pair of second adhesive openings located at the tongue portion, the pair of second adhesive openings are configured for another partial structure of the insulating body to pass through, and the pair of second adhesive openings are not on the straight line.

14. The electrical connector according to claim 13, wherein the second adhesive opening only overlaps with a ground terminal of the plurality of terminals.

15. The electrical connector according to claim 13, wherein the second adhesive opening does not overlap with a high-speed signal terminal of the plurality of terminals.

16. The electrical connector according to claim 13, wherein a distance between the second adhesive opening and the notch is greater than a distance between the first adhesive opening and the notch.

17. The electrical connector according to claim 13, wherein a distance between the second adhesive opening and the front edge is greater than a distance between the first adhesive opening and the front edge.

18. The electrical connector according to claim 13, wherein the metallic plate further has a third adhesive opening located between the pair of second adhesive openings and arranged along another straight line with the pair of second adhesive openings.

19. The electrical connector according to claim 18, wherein the metallic plate further has an opening located at the tongue portion and arranged along a mating axial direction of the electrical connector with the notch, and the third adhesive opening is located between the notch and the opening along the mating axial direction.

20. The electrical connector according to claim 18, wherein the metallic plate further has an opening located at the tongue portion and arranged along a mating axial direction of the electrical connector, and the third adhesive opening is a portion of the opening.

21. The electrical connector according to claim 10, wherein the metallic plate further has an opening extending from the tongue portion to the base portion.

22. The electrical connector according to claim 10, wherein a plurality of power terminals of the plurality of terminals partially protrude from the notch, ends of a plurality of low-speed signal terminals of the plurality of terminals keep a distance from the notch, and the plurality of low-speed signal terminals are located between the plurality of power terminals.

23. The electrical connector according to claim 10, wherein the insulating body has a supporting block located at the tongue portion, a power terminal or a ground terminal of the plurality of terminals is supported on the metallic plate by the supporting block to keep a distance from the metallic plate, and a length of the power terminal or the ground terminal at the tongue portion is greater than a length of remaining terminals at the tongue portion.

* * * * *